United States Patent [19]

Roesler et al.

[11] Patent Number: 5,059,027

[45] Date of Patent: Oct. 22, 1991

[54] SPATIAL HETERODYNE SPECTROMETER AND METHOD

[75] Inventors: Fred L. Roesler; John Harlander, both of Madison, Wis.

[73] Assignee: Wisconsin Alumni Research Foundation, Madison, Wis.

[21] Appl. No.: 336,068

[22] Filed: Apr. 11, 1989

[51] Int. Cl.$^5$ ........................... G01B 9/02; G01J 3/45
[52] U.S. Cl. ..................................... 356/346; 356/354
[58] Field of Search ............................... 356/346, 354

[56] References Cited

U.S. PATENT DOCUMENTS 3,684,379  8/1972  Girard ................................. 356/346
4,523,846  6/1985  Breckinridge et al. ............. 356/346

OTHER PUBLICATIONS

Connes, P., "Un Nouveau Type de Spectrometre: L'interfereometre a Reseaux," Optica Acta, vol. 4, Dec. 1957, pp. 136–144 (in French with an English language summary).
Connes, P., "Spectrometre Intereferentiel A Selection Par L'Amplitude de Modulation," J. De Physique et le Radium, vol. 19, Mar. 1958, pp. 215–222.
Fonck, R. J. et al., "All-Reflection Michelson Interferometer: Analysis and Test for Far IR Fourier Spectroscopy," Applied Optics, vol. 17, No. 11, Jun. 1, 1978, pp. 1739–1747.
Kruger, R. A. et al., "All-Reflection Intereferometer for Use as a Fourier–Transform Spectrometer," J. Optical Society of America, vol. 62, No. 8.
Kruger, R. A. et al., "New Fourier Transform All-Reflection Interferometer," Applied Optics, vol. 12, No. 3, Mar. 1973, pp. 533–540.
Roesler, F. L., "Fabry–Perot Instrument for Astronomy," in Methods of Experimental Physics, vol. 12, Part A: Optical and Infrared, Academic Press, New York, 1974.
Roesler, F. L. et al., "An All-Reflection Interferometer with Possible Applications in the Vacuum Ultraviolet," Space Optics, ISBN 0-309-02144-8, National Academy of Sciences, Washington, D.C., 1974, pp. 355 at seq.
"Numerical Recipes—The Art of Scientific Computing," W. H. Press et al., Cambridge University Press 1986, Chapter 12, pp. 290–396, 449–453.
Jacquinot, P., "New Developments in Interference Spectroscopy," Rep. Progi. Phys., vol. 23, 1960, pp. 288–294.
Dohi, T. et al., "Attainment of High Resolution Holographic Fourier Transform Spectroscopy," Applied Optics, vol. 10, No. 5, May 1971, pp. 1137–1140.
Butcher, H., "Heterodyned, Holographic Spectrometry," A Report to the European Southern Observatory, 20 pages, 6 figures.
Butcher, H. et al., "A Practical Non-Scanning FTS for Astronomy," from High Resolution Fourier Transform Spectroscopy: 1989 Technical Digest Series, vol. 6, Optical Society of America, Washington, D.C., Proceedings of meeting held Feb. 13–15, 1989, pp. MA4–1 to MA4–4.

*Primary Examiner*—Davis L. Willis
*Assistant Examiner*—Matthew W. Koren
*Attorney, Agent, or Firm*—Foley & Lardner

[57] ABSTRACT

A spatial heterodyne spectrometer has a two beam dispersive interferometer which includes a diffraction grating as a beam splitter/combiner. An incoming beam is collimated and passed to the grating in the interferometer where it is split into two beams which are recombined such that the angle between the wavefronts in the recombined beam at a particular wavelength is directly related to the deviation of that wavelength from a null wavelength at which the wavefronts are parallel. The recombined output beam is focused and imaged to produce Fizeau fringes across the output aperture, with these fringes being recorded on an imaging detector. The spatially varying intensity output of the imaging detector is Fourier transformed to yield an output indicative of the spectral frequency content of the image which is related to the wavelength content of the incoming beam from the source.

33 Claims, 8 Drawing Sheets

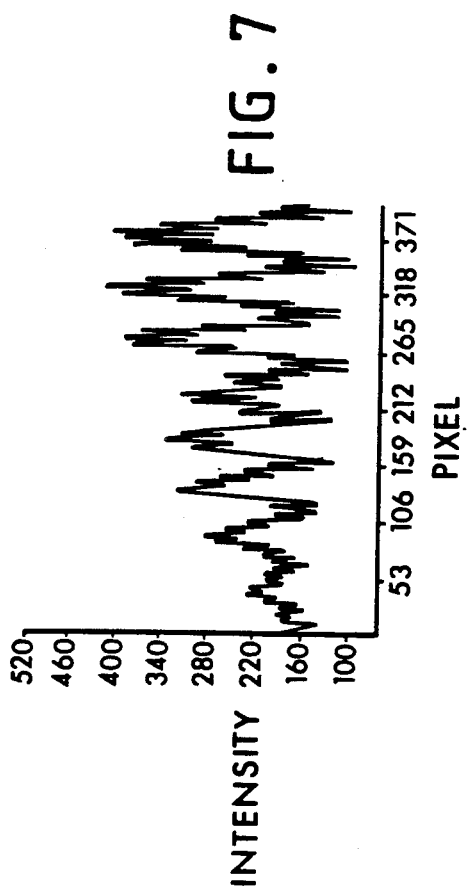
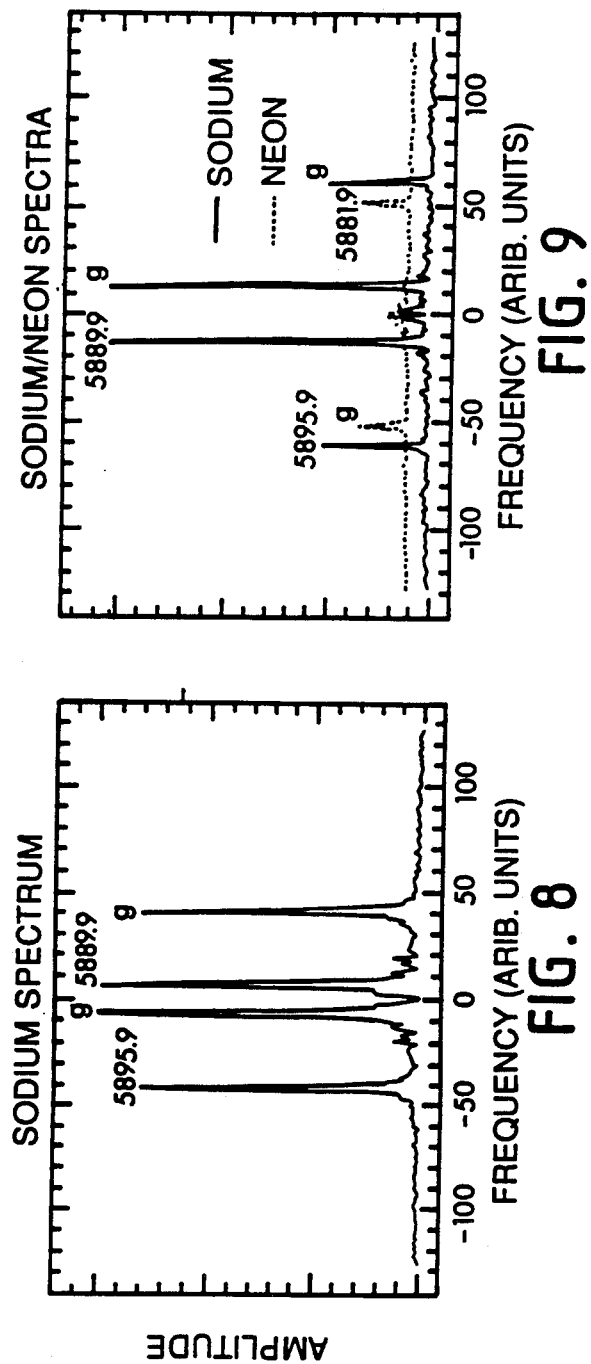

SPATIAL HETERODYNE SPECTROMETER AND METHOD

FIELD OF THE INVENTION

This invention pertains generally to the field of optical instruments and particularly to interference spectrometers.

BACKGROUND OF THE INVENTION

It is well known that interference spectrometers offer significant advantages compared to conventional grating spectrometers in the study of faint, extended sources. The primary advantages are (1) an etendue (or throughput) which is typically 200 times larger than a grating spectrometers operating at similar resolutions, (2) compact size, especially at high spectral resolution, (3) no requirement for high precision optics in the input-/output optical systems, and (4) relative ease of obtaining high spectral resolution. In combination, these advantages offer important economies in observation time, cost, weight and volume for many important programs, particularly where size and weight are crucial as in satellite based systems.

All reflection, scanning Fourier transform spectrometers utilizing these principles are presently available and have been thoroughly studied. See, e.g., R. A. Kruger, L. W. Anderson, and F. L. Roesler, "All-Reflection Interferometer for Use as a Fourier Transform Spectrometer," J. Opt. Soc. Am., Vol. 62, 1972, p. 938 et seq; F. L. Roesler, "Fabry-Perot Instrument for Astronomy," in Methods of Experimental Physics, Vol. 12, Part A: Optical and Infrared, Academic Press, New York, 1974; R. J. Fonck, et al., "All Reflection Michelson Interferometer: Analysis and Test for Far IR Fourier Spectroscopy," Applied Optics, Vol. 17, 1978, p. 1739 et seq. Such scanning instruments have the advantages of interference spectroscopy, but require complex driving and control mechanisms for the scanning components, e.g., the moving mirror, which are complicated, expensive, and subject to maintenance and reliability problems inherent in an instrument employing moving parts.

SUMMARY OF THE INVENTION

The spatial heterodyne spectrometer of the present invention provides the advantages of interferences spectroscopy, but avoids most of the complex problems encountered with the scanning and control mechanisms of scanning type Fourier transform spectrometers. It can be constructed with a compact and relatively robust structure, making it an ideal instrument for use in satellite based spectroscopy. In operation, it requires stability but neither critical alignment nor scanning, and has no moving parts.

The spectrometer of the invention utilizes a two beam dispersive interferometer which may include a diffraction grating as a beam splitter/combiner. The interferometer produces two coherent wavefronts from an incident radiation beam and recombines the two with a wavelength dependent angle $\alpha$ between them. The interferometer is adjusted so that for a selected wavelength $\lambda_o$, the recombined wavefronts are parallel to one another. For wavelengths $\lambda$ in the incoming beam which are not equal to the selected wavelength $\lambda_o$, the angle $\alpha$ is given by $\alpha = D(\lambda - \lambda_o)$ where D is the angular dispersion for the system. The wavefronts for the two beams at the wavelength $\lambda$ as they exit the interferometer are thus tilted with respect to each other by the angle $\alpha$. When these crossed wavefronts are focused and imaged, they produce Fizeau fringes across the output aperture of a width A with a spatial frequency $f_s$ given by:

$$f_s = \alpha/\lambda_0 = \frac{D}{\lambda_0}(\lambda - \lambda_0)$$

The Fizeau fringes produced by the beams exiting the interferometer are then recorded on an imaging detector which produces an output signal indicative of the variation in the image intensity across the width of the detector. The recorded image on a linear detector is related to the Fourier transform of the spectrum with a mathematical zero corresponding to the selected wavelength $\lambda_o$. The detected image is thus the spatial analog of the heterodyne technique in the detection of radio waves, with the chosen spectral frequency (at the wavelength $\lambda_o$) corresponding to the local oscillator frequency.

The dispersive two beam interferometer can utilize all reflective components to minimize attenuation and particularly to allow the interferometer to be operated at ultra-violet wavelengths, although transmitting elements may also be used where appropriate. A variety of configurations for the optical elements of the interferometer may be utilized.

Further objects, features, and advantages of the invention will be apparent from the following detailed description when taken in conjunction with the accompanying drawings.

BRIEF DESCRIPTION OF THE DRAWINGS

In the drawings:

FIG. 7 is a photograph of the fringe pattern formed by the Na doublet 5890Å and 5896Å using a spectrometer with the interferometer configuration shown in FIG. 5 with a superimposed graph of intensity along one column.

FIG. 8 is a one dimensional Fourier transform of the sodium doublet fringe pattern of FIG. 7.

FIG. 9 is a graph showing the superposition of the one dimensional Fourier transform of the sodium doublet and the neon fringe patterns produced with the same base wavelength setting. Both wavelengths and ghosts are indicated in the figure.

DETAILED DESCRIPTION OF THE INVENTION

Figure 1:
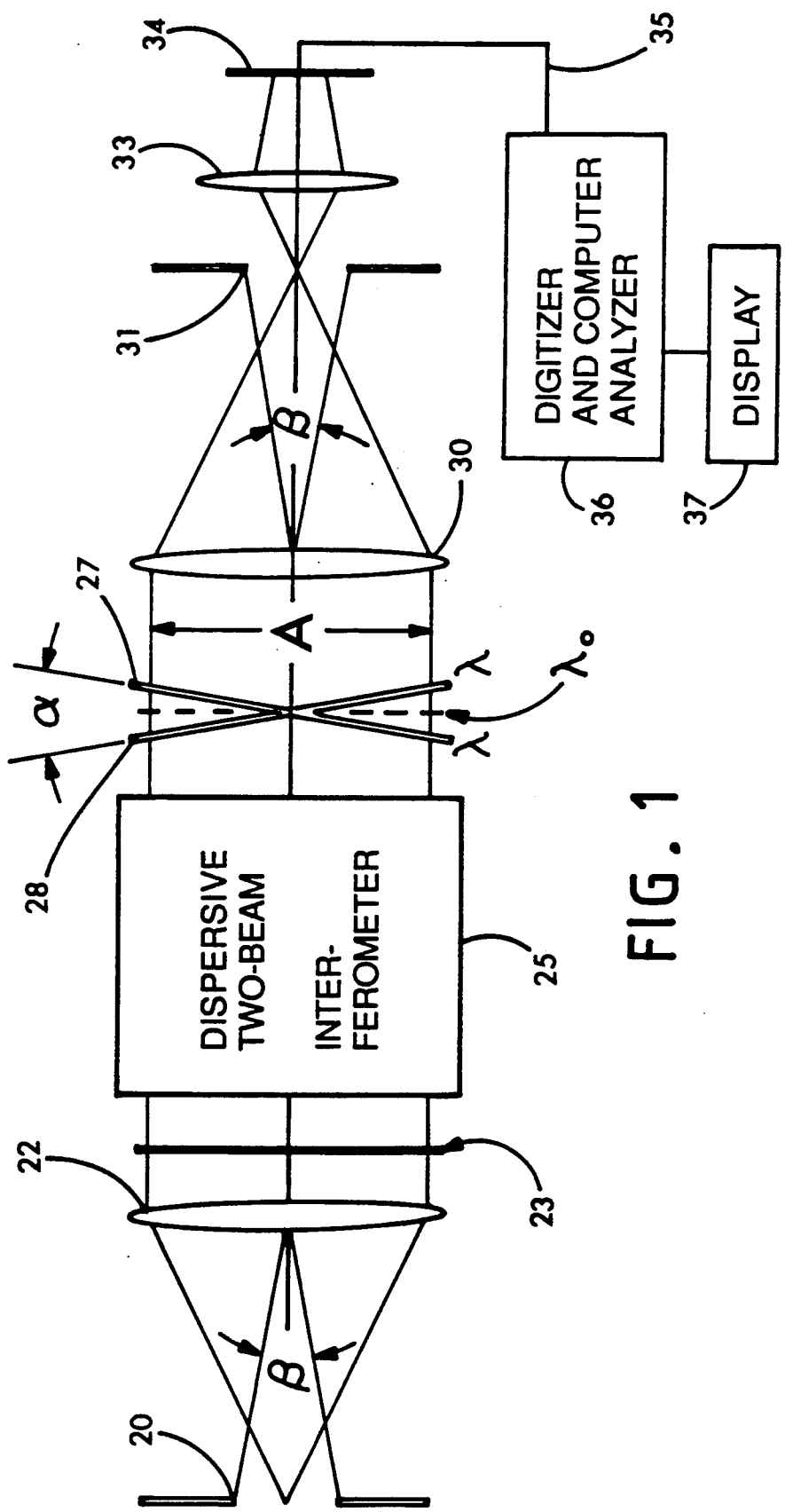
FIG. 1 is a schematic view of a generalized spatial heterodyne spectrometer which illustrates the principles of the invention.

A schematic view of a spatial heterodyne spectrometer in accordance with the invention is shown in FIG. 1 receiving incoming electromagnetic radiation through an input aperture 20. For simplicity in description, the incoming electromagnetic waves will be referred to herein as "light" although it should be understood that the spectrometer of the present invention may be utilized with many different wavelengths, and may be constructed to be particularly adapted to analysis of nonvisible wavelengths, such as infrared or ultraviolet. Because of the characteristics of the spectrometer in several of its configurations, as described further below, the spectrometer is particularly suited to the investigation of ultra-violet emissions from planetary and other astronomical sources. However, the principles of the invention apply equally to other wavelengths such as visible light and infrared, with suitable choice of the optical elements employed. Thus, there may be many types of sources for the incoming light being investigated.

The light passed through the aperture 20 is received and collimated by an input "lens" 22 which is shown as a refracting element but may also be a reflecting input beam, as described further below. The now collimated incident wavefront 23 emerging from the input lens is received into a dispersive two beam interferometer 25 which has the characteristic that it derives two coherent wavefronts from the incident wavefront and recombines them with a wavelength dependent angle $\alpha$ between them, as illustrated by the two wavefronts 27 and 28 shown in FIG. 1. It is understood, of course, that the wavefronts illustrated are for a single wavelength, and that a typical source will have many wavelengths to be investigated which, as explained below, will be separated from one another by their own characteristic separation angle $\alpha$. The recombined wavefronts are focused by an exit lens 30 through an output aperture 31 and are received by a fringe imaging lens 33 which images the received light onto an imaging detector 34. The detector 34 puts out an electrical signal on an output line or lines 35 indicative of the intensity of the received light at each of a pluralities of pixels which span across the width of the detector in the area on which the image is received. The output of the line 35 is received by a digitizer and computer analyzer 36 and a display of the results of the Fourier analysis are provided to the user on a display device 37, such as a cathode ray tube screen or a printer. Any suitable commercial available computing equipment may be utilized fo the analyzer 36, for example, a DEC Micro-Vax. Suitable Fourier analysis techniques are well known, fo example, as described in "Numerical Recipes—The Ar of Scientific Computing," W. H. Press, et al., Cambridge University Press, 1986, Chapter 12, pp. 290-397 449-453, incorporated herein by reference.

The interferometer 25 is adjusted so that for a selected wavelength $\lambda_o$ the recombined wavefronts 27 and 28 are parallel to one another. For wavefronts having a wavelength $\lambda$ not equal to $\lambda_o$, the angle $\alpha$ between the two wavefronts 27 and 28 is given by the expression $\alpha = D(\lambda - \lambda_o)$, where D is the angular dispersion for this system and is given by:

$$D = \frac{\partial \alpha}{\partial \lambda}$$

The crossed wavefronts 27 and 28 produce Fizeau fringes across the output aperture of width A with a spatial frequency $f_s$ given by the expression:

$$f_s = \alpha/\lambda_0 = \frac{D}{\lambda_0}(\lambda - \lambda_0)$$

These fringes are recorded on the imaging detector 34. The recorded image on a linear detector is related to the Fourier transform of the spectrum received with the mathematical zero corresponding to the wavelength $\lambda_o$ It is in this sense that the spectrometer is the spatial analog of the radio receiver heterodyne technique, with the light frequency $C/\lambda_o$ being the analog of the local oscillator frequency in the radio receiver.

The resolution limit of the system is determined by the wavelength difference $\delta\lambda$ which produces a one cycle difference in the spatial intensity modulation across the output aperture of width A. This may be expressed as:

$$A \frac{\partial f_s}{\partial \lambda} \delta\lambda = 1$$

Using the above expression for the present system:

$$A D = \frac{\lambda_0}{\delta\lambda} = R_0$$

Where $R_O$ is the theoretical resolving power and is the general expression for the resolving power achieved by the present technique. It is noted that this expression is identical to the expression for conventional dispersion systems (slit spectrometers) using prism or grating dispersers.

The overall advantage of the present spectrometer depends on how large the acceptance angle $\beta$, illustrated in FIG. 1, can be made without degrading the resolving power. It may be shown by direct calculation for various dispersive interferometer configurations that the acceptance angle is approximately $$\beta = \sqrt{8/R_0} \cos\theta,$$

where $\theta$ is the diffraction angle of the dispersing element at $\lambda_o$. Thus, the high etendue characteristic of interference spectroscopy is achieved. In addition, for detector-noise limited conditions, a large muliplex gain is achieved because of the large number of spectral elements simultaneously recorded.

Figure 2:
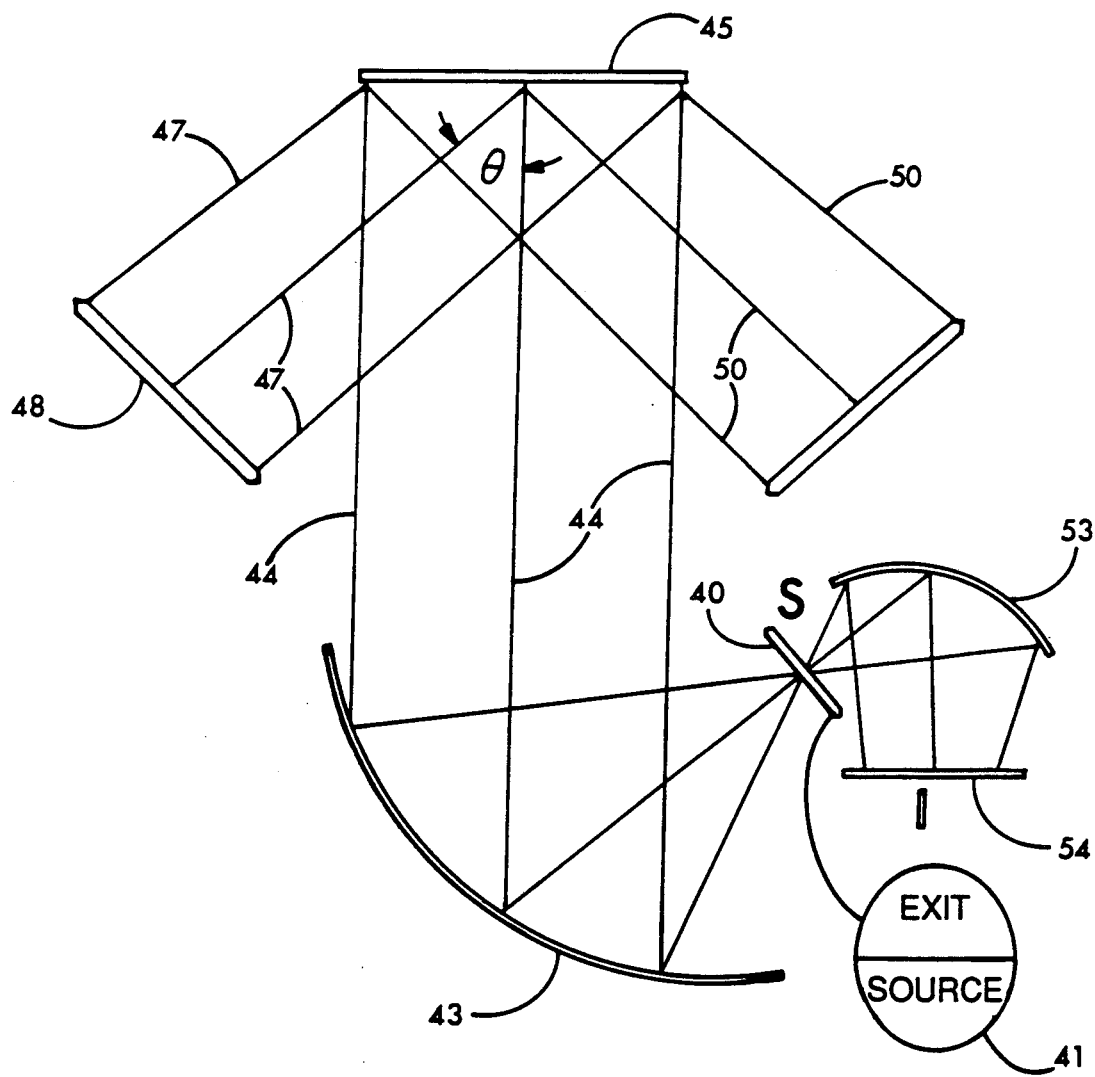
FIG. 2 is a schematic view of a basic configuration for the optical elements of the two beam interferometer and the ancillary optics which implement the spectrometer of FIG. 1.

FIG. 2 shows a basic optical configuration for the spectrometer of the invention using all reflective elements. At an aperture 40 there is a region S which is in the plane of the elliptical bulls-eye pattern formed by this type of interferometer. As illustrated by the schematic ellipse labeled 41 in FIG. 2, the aperture is split between exit and source beams, with only the exit beam being shown in FIG. 2. The light from the source (not shown) enters the upper portion of the aperture at 40, and is collimated by a mirror 43 into a collimated beam illustrated by the lines labeled 44 in FIG. 2. The beam 44 impinges upon a beam splitting grating 45 which may be holographically produced to provide symmetric splitting. The beam 44 is divided by the grating 45 into one beam illustrated by the lines labeled 47 which strikes a flat mirror 48 and into a second beam illustrated by the lines labeled 50 which strikes the second flat mirror 51. For incoming light of a wavelength $\lambda_o = d \sin \theta$ the wavefronts emerge from the grating parallel to the flat surfaces of the mirrors 48 and 51 in the respective arms of the interferometer, are reflected by these flat mirrors back to the grating 45 and then reflected back along the same path as the incoming beam 44 to the mirror 43, and thence are focused through the exit portion of the aperture 40. The exit field varies in intensity from bright to dark depending on the path difference in the interferometer arms. Light emerging from the exit aperture is imaged by an imaging mirror 53 to form an image on an imaging detector 54. The signal from the detector is received and analyzed as described above. For light of wavelength $\lambda_o$, for which the recombining wavefronts are parallel, the intensity distribution on the imager is uniformly bright (i.e., constructive interference for appropriate choice of path difference) corresponding to the source brightness at $\lambda_o$.

Figure 3:
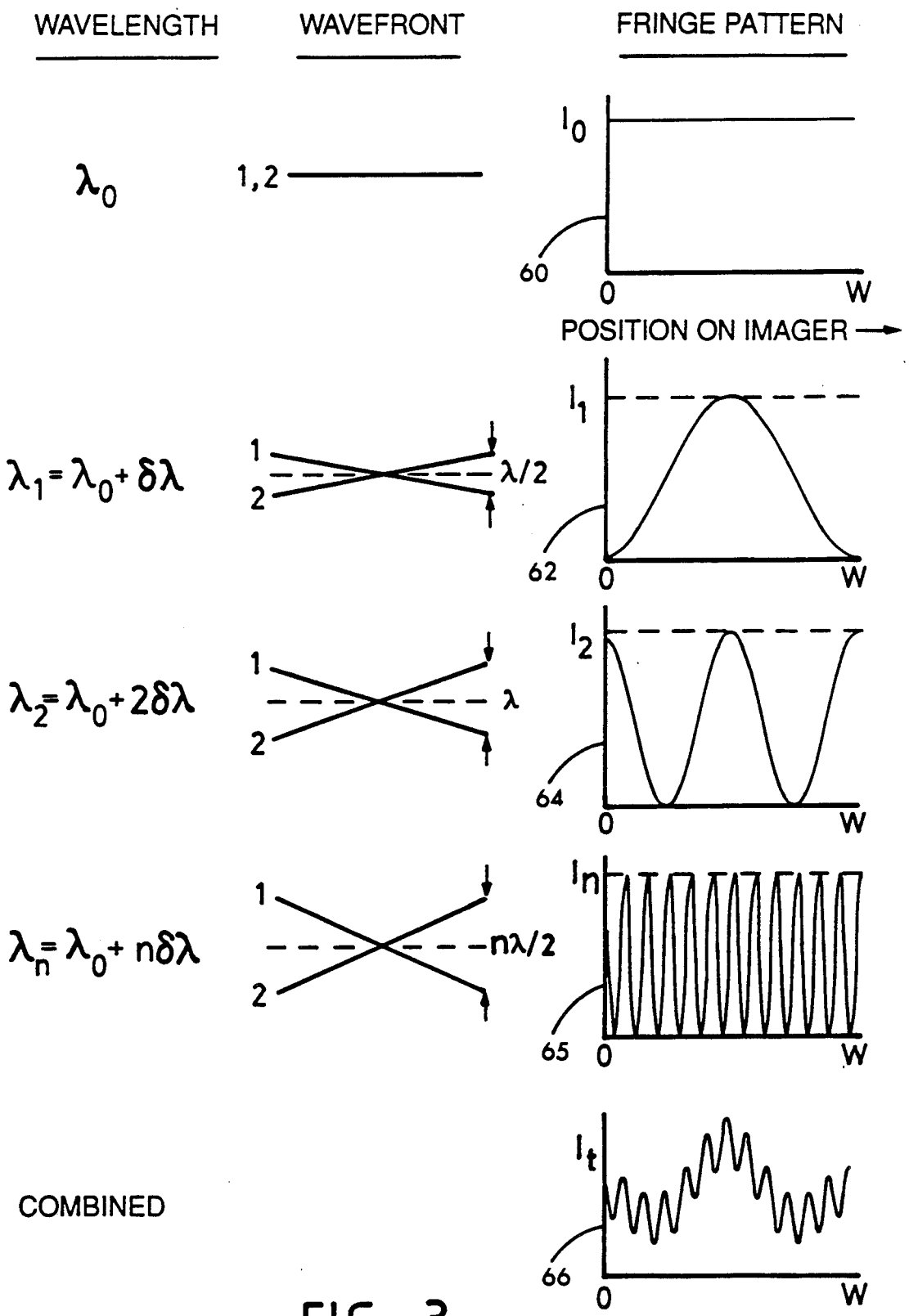
FIG. 3 is a sequence of illustrative diagrams indicating the relationship between fringe patterns and wavelengths.

Referring now to FIG. 3, the wavefronts and the intensity patterns they produce on the imager are represented. For a radiation of wavelength $\lambda$, near to the selected wavelength $\lambda_o$, the diffracted wavefronts are no longer parallel to the mirrors 48 and 51 in the respective interferometer arms and hence recombine slightly crossed. The tilted wavefronts reduce the constrast in the bulls-eye pattern at the image surface S, but on the imager they produce a spatial frequency in the intensity pattern corresponding to the tilt between them and have an intensity modulation amplitude proportional to the source intensity at $\lambda_o$.

Spectral elements more distant from the null wavelength have larger tilts, and correspondingly produce higher spatial frequencies at the imager. A one cycle tilt differential at the imager corresponds to the grating resolution limit. For the geometry of FIG. 2, the resolving power is $R_O = 4W \sin \theta / \lambda$, where W is the width of the grating and $\theta$ is the diffraction angle. It may be noted that the limiting resolving power is simply the maximum path difference in the system divided by the wavelength. FIG. 3 shows the fringe pattern on the imager for a light source having a single wavelength at the null wavelength $\lambda_o$ as shown in the graph 60, for a single wavefront deviating from the null wavelength by $\delta\lambda$ illustrated by the graph 62, for a wavefront deviating from the null wavelength by $2\delta\lambda$ illustrated by the graph 64, for a wavefront deviating from the null wavelength by some arbitrary deviation $\eta\delta\lambda$, illustrated by the graph 65, and the image on the imager illustrated by the graph 66 when all of the foregoing are present and combined to form the image.

Figure 4:
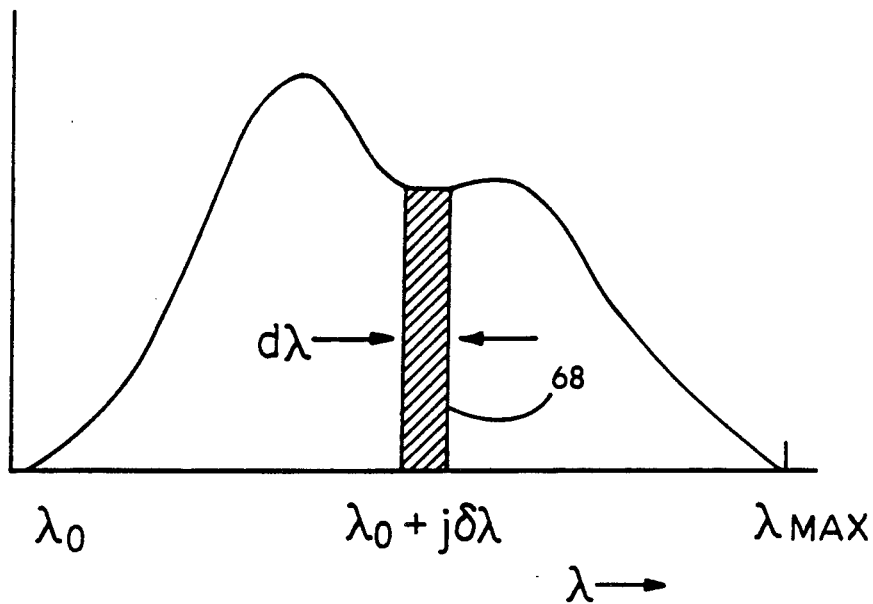
FIG. 4 is a graph of a hypothetical emission line for illustrative purposes in describing the operation of the spectrometer.

As a further illustration, reference may be had to the hypothetical spectra of FIG. 4 with an isolated emission line labeled 68. The Fourier transform of this line profile is recorded on the imager. Each one cycle increase in the spatial frequency corresponds to an additional increment $\delta\lambda$ from the null spatial frequency at $\lambda_o$. In this manner, the resolution limit of the grating is achieved, and an imager having a width of N pixels can record N/2 spectral elements. For example, for a 1,000 element detector, 500 spectral elements could be measured. For a resolving power of 500,000 at 1215 A, this would correspond to a spectral range of 1.2 A.

The system as described above cannot ordinarily distinguish between $\lambda_o + \delta\lambda$ and $\lambda_o - \delta\lambda$. This ambiguity can be overcome by tilting the mirror 48 slightly relative to the mirror 51 perpendicular to the dispersion direction, thus producing several fringes in the y direction (a nominally wavelength-independent spatial modulation) in addition to the strongly wavelength dependent modulation in the x direction. This produces a wavelength dependent rotation of the fringes, with wavelengths $\lambda > \lambda_o$ being rotated clockwise (by adjustment choice), and wavelengths $\lambda < \lambda_o$ being rotated counterclockwise.

It is also necessary to remove the spatial frequency spectrum in the flat field pattern at the imager. This can be accomplished by taking two equal exposures ($I_1$ and $I_2$) wherein there is a total path difference through the spectrometer equal to $\lambda_o/2$ between the two exposures. In the narrow spectral range being covered, $I_2$ is simply the complement of $I_1$. The sum of these two images contains no spectral information ($\sin^2 \theta + \cos^2 \theta = 1$), while the difference of the images produces a double-amplitude spatial transform of the spectrum. The final image pattern $I_c$ resulting from $(I_1 - I_2)/(I_1 + I_2)$ is flat field corrected and has twice the amplitude of a single exposure so that the loss of observing time is minimal. For two dimensional imaging at each pixel i, j, the Fourier transform of $I_c$ produces a spectrum without artifacts due to spatial irregularities of the source or the spectrometer instrument.

While the basic configuration described above is relatively simple it has some limitations that may restrict its usefulness. In particular, the resolving power cannot be changed independently of the basic geometry. For example, if the system uses a 3,600 line/mm grating which is 50 mm wide and operates at $\lambda = 0.1\mu$, it has a resolving power of $4W \sin \theta / \lambda$ (about 700,000); however, for an R of about 100,000 the useful grating width is only 7 mm. The use of a larger grating (thus achieving a larger light gathering power) would require smaller grating angles, resulting in an inconveniently large structure, since the mirrors 48 and 51 would need to be moved far back to avoid blocking the entrance and exit beams.

Figure 5:
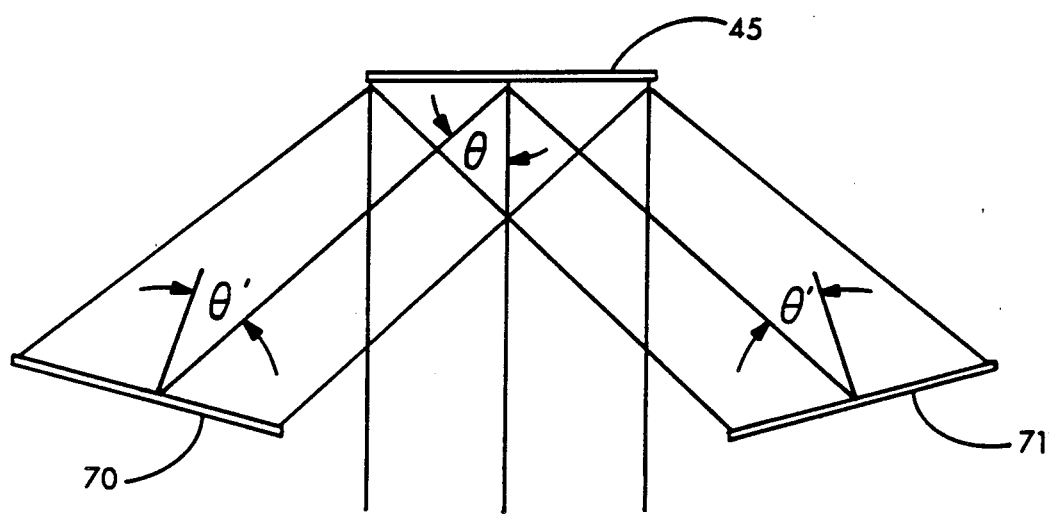
FIG. 5 is a schematic view of the interferometer portion of the spectrometer that allows the resolving power to be selected independently of the grating width.

The interferometer structure illustrated in FIG. 5 addresses the problem just described although it is conceptally identical to the basic configuration. The return mirrors 48 and 51 are replaced by identical return gratings 70 and 71 which have different properties from the main grating 45 so that they operate at an angle $\theta'$. These gratings reduce the dispersion of the main grating 45 to a desired value by proper choice of their line spacing and blaze angle. The net resolving power is $R = R_O (1 - \tan \theta' \cot \theta)$, where $R_O$ is the resolving power of the main grating 45 used in the basic configuration.

A disadvantage of the configurations of FIGS. 2 and 5 is that the input and output beams are not separated. This requires the use of a split input-output aperture with loss of potential throughput, and also allows zero order and cross order light to return directly to the exit portion of the aperture where these portions can contribute a large parasitic light background that reduces sensitivity. This effect may be partially overcome by tilting the gratings 70 and 71 (or the mirrors 48 and 51) with respect to the grating 45 by relatively large and equal amounts with, however, small differential tilts to remove the Fourier transform ambiguity as discussed above. However, this modification may serve to reduce the throughput of the system.

Figure 6:
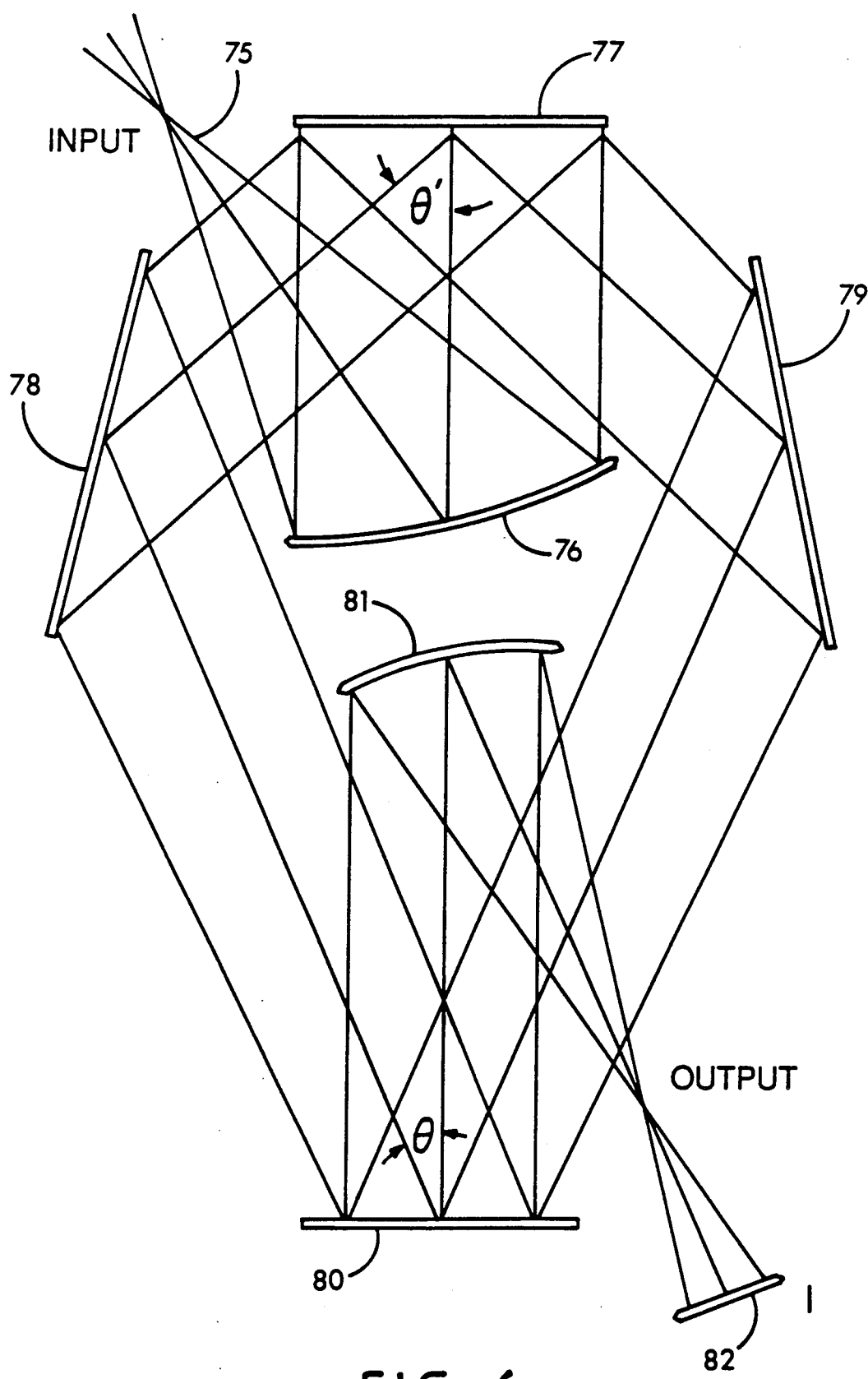
FIG. 6 is another arrangement of the optical elements of the spectrometer of the invention that allows input and output beams to be separated, and also allows selectable resolution.

The configuration for the interferometer shown in FIG. 6 is conceptually identical to the instruments described above, but allows separated input and output beams. The incoming and diverging light beam 75 is received and collimated by a mirror 76 onto a first dispersion grating 77 which splits the incoming beam into two beams at an angle $\theta'$ which are reflected to mirrors 78 and 79. The beams reflected from the mirror 78 and 79 reach a second grating 82 where the beams are combined and directed to an imaging mirror 81 which directs the output beam to an imaging detector 82. The resulting resolving power can be selected up to a maximum inpendently of grating size, and is given by the expression:

$$R = R_O/2(1 - \tan\theta' \cot\theta),$$

where $R_O$ is the resolving power of the grating 80 when it is used in the basic configuration of FIG. 2. Because of the larger overall size of the configuration of FIG. 6, it may be somewhat more subject to instabilities and alignment errors than the systems previously described.

The spectrometer configurations of the present invention have the important practical advantage that they are exceptionally forgiving of errors. The fringe patterns they record for a monochromatic input, are, in fact, measurements of wavefront errors in the exact state of alignment. Thus, if the fringe pattern of a known calibration lamp is measured, this pattern may be used to make a correction in software in the analyzer 36 for the adjustment state of the instrument and the features of the optical surfaces at the time an observation is made. While stability within about a tenth of a wavelength is ordinarilly required during an exposure, long term drifts and the effects of impacts or vibration within achievable mechanical stability requirements may be almost entirely corrected.

For the spectrometer configurations described above, although the resolving power is determined by the gratings, the range of allowed input angles $\beta$ for that resolving power is typical of interferometric instruments (Michelson and Fabry-Perot spectrometers). Specifically, the angle $\beta$ is limited by:

$$\beta_{para} = \beta_I \cos\theta$$

$$\beta_{perp} = \beta_I$$

$$\beta_I = \sqrt{8/R}$$

where $\beta_{para}$ is the angular size of the input aperture measured parallel to the dispersion, $\beta_{perp}$ is the same quanity of the plane perpendicular to the dispersion direction, $\theta$ is the grating angle as indicated in the foregoing figures, R is the resolving power for the system and $\beta_I$ is the angular size of the input aperture typically used in Fabry-Perot or Michelson interference spectroscopy at the same resolving power.

In an exemplary system, the triple grating configuration of FIG. 5 was tested using a charge coupled device (CCD) imaging detector using the sodium D doublet (5889.95Å and 5895.92Å). The beam splitter grating (the grating 45 in FIG. 5) was holographically ruled with a diffraction angle $\theta$ of 45° at 5890Å (first order diffraction at normal incidence with a groove spacing of approximately 1200 grooves/mm). The side return gratings 70 and 71 were conventionally blazed gratings with a diffraction angle $\theta'$ of 20.7° at 5890Å (first order Littrow with a groove spacing of 1200 grooves/mm). The resolving power of this system was calculated to be 45,000. FIG. 7 shows the intensity pattern recorded on the CCD detector for this system. The background in the figure is a greyscale image of the intensity pattern showing two distinct spatial frequencies. Overlying this pattern is a line plot which represents the intensity verses pixel number for a vertical slice one pixel wide through the image. The null wavelength ($\lambda_o$) was set at approximately 5891Å. Thus, the low frequency modulation is attributed to the 5890Å line and the high frequency modulation is attributed to the 5896Å line. The amplitude of the one dimensional Fourier transform of the line plot of FIG. 7 is shown in FIG. 8. To approximate the corrections for dark count and scattered light, the average of all the pixels in the column was subtracted from the data before transforming. No correction was made for the non-uniform flat field which is attributed, for the most part, to blemishes (fingerprints) on the beam splitter grating. FIG. 7 shows a "true" spectrum resulting from the symmetric transform and a "ghost" spectrum which are images of each other when reflected through $\lambda_o$. It may be noted, however, that FIG. 7 shows differential fringe rotation due to the differential tilts between the gratings 70 and 71 as described above. A two dimensional Fourier transform could be utilized to separate true and ghost lines. Also evident in the view is excess noise near the null wavelength $\lambda_o$ due to incomplete corrections for flat field, dark count and scattered light.

FIG. 8 shows the amplitude of the one dimensional Fourier transform of the data taken with the same system, but with the null wavelength $\lambda_o$ now set near 5888Å. FIG. 9 shows superimposed spectra obtained by using sodium and neon sources. If a sodium doublet is used to calibrate the wavelength scale, the calculated position of the neon line is 5881.87Å, which is in good agreement with the tabulated value of 5881.89Å.

To achieve high fringe contrast in the foregoing test, the zero order light from the beamsplitter grating had to be removed from the output. This was accomplished by rotating the side gratings (the gratings 70 and 71 in FIG. 5) about axes parallel to their dispersion plane. This rotation, when viewed in the plane of the aperture, separated the zero order and cross order light from the output. A mask was placed in the aperture plane which prevented the zero and cross order light from reaching the detector. This technique has the effect of reducing the measured intensity of the higher spectral components. Light of higher spectral frequency is returned to the aperture plane relatively further from the optical axes in the plane of dispersion and was partially blocked by the mask. The technique also has the effect of reducing the angular size of the aperture $\beta$. It should be noted that zero and cross order light are not a problem with the double grating system of FIG. 6 since the input and output beams are separated.

Figure 10:
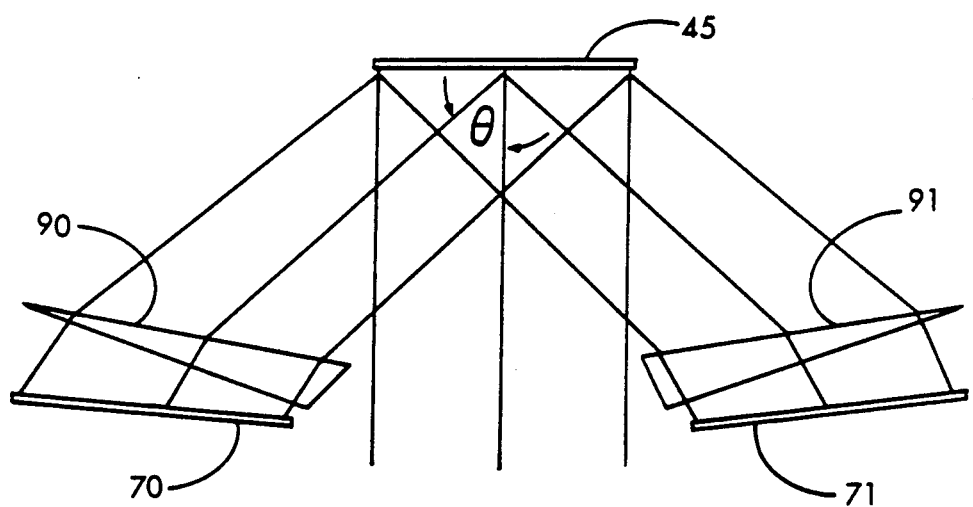
FIG. 10 is a schematic view of a modified version of the interferometer for the spectrometer configuration of FIG. 2 in which prism wedges are utilized for field compensation.

FIG. 10 shows a variation of the configuration of FIG. 5 in which field compensation is obtained. Prism wedges 90 and 91 are inserted in the paths of the beams between the main grating 45 and the return grating 70 and between the grating 45 and the return grating 71, respectively. These compensation prisms serve to eliminate or minimize the geometrical path differences that limit the allowable $\beta$ range, while maintaining suitable physical path differences, and thus suitable fringe spatial frequencies, to achieve the desired resolving power. The light gathering power (etendue) may thus be increased by a large factor (typically of the order of 100) compared to uncompensated systems. The system of FIG. 10 has the limitation that its spectral range is restricted to regions where suitable transmission materials exist for construction of the prism wedges 90 and 91.

Figure 11:
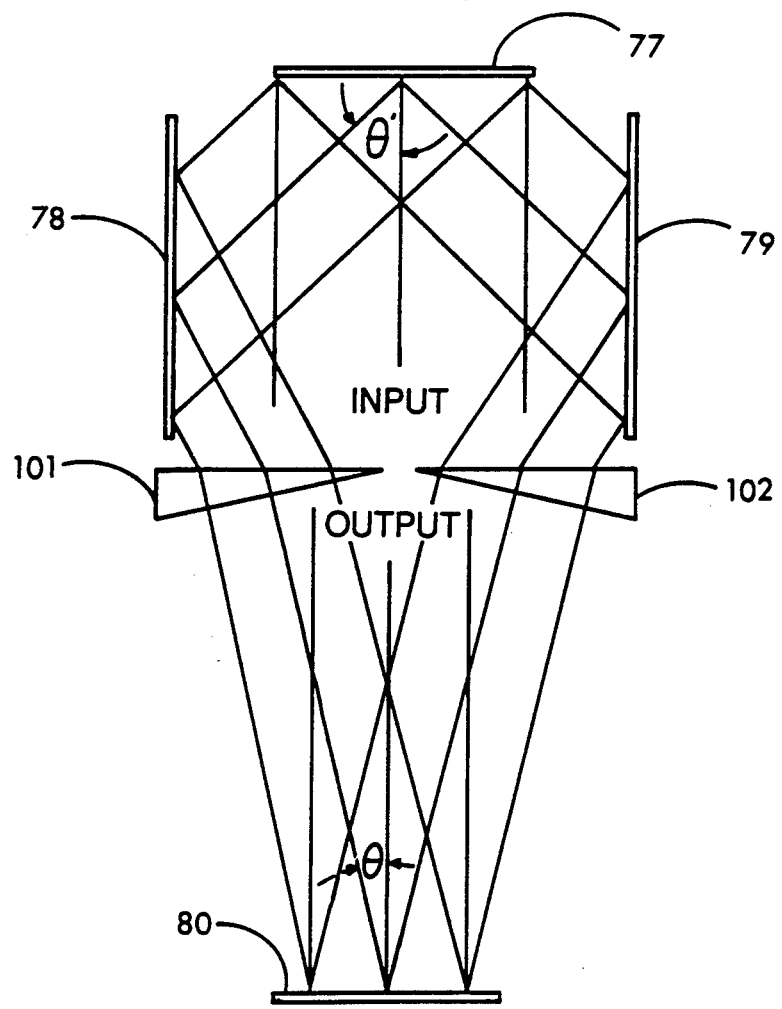
FIG. 11 is a schematic view of another interferometer configuration for the spectrometer configuration of FIG. 6 in which prism wedges are utilized for field compensation.

A field compensation configuration for utilization in the system of FIG. 6 is shown in FIG. 11. Prisms 101 and 102 are inserted in the beams from the separated arms of the interferometer, thereby increasing the light gathering power (etendue) again by a large factor, such as 100 or more, compared to uncompensated systems. Again, the limitation for such a construction is that it can only be utilized in spectral regions where suitable materials exist for construction of the prism wedges 101 and 102.

Figure 12:
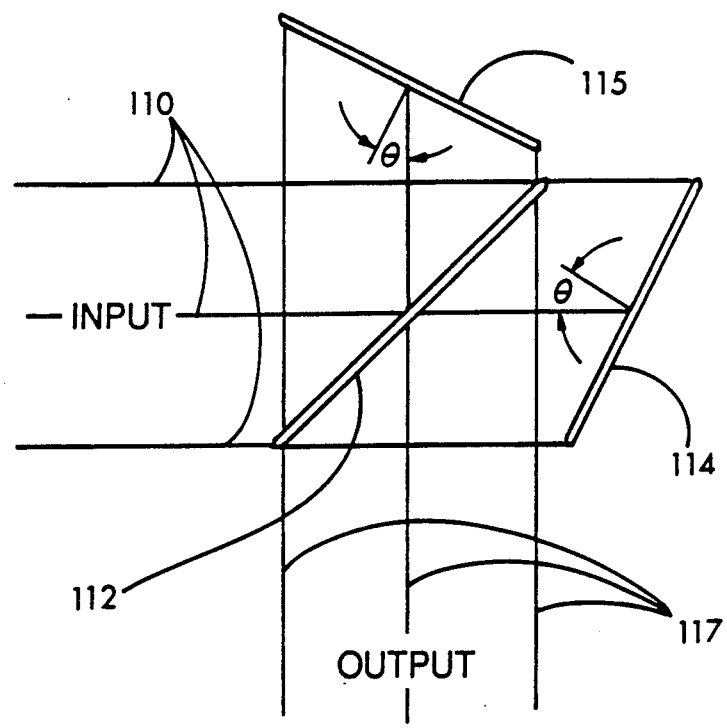
FIG. 12 is a schematic view of a configuration for a two beam interferometer which may be utilized in the spectrometer of FIG. 2 in which a transmitting/reflecting beam splitter is utilized to develop the recombined output beam.

Another configuration which gives full separation of the input and output beams through the interferometer is shown in FIG. 12. The collimated input beam, represented by the lines 110 is incident upon a partially transmitting and partially reflecting beam splitter 112 which transmits part of the beam to a grating 114 and reflects part of the beam to an identical grating 115. The gratings 114 and 115 have dispersion angles $\theta$ and are oriented appropriately with respect to the beam splitter and their dispersion angles to direct one of the dispersed beams back to the beam splitter 112 where the beams from the gratings 114 and 115 are combined to form a collimated output beam represented by the lines 117. This system allows the input and output beams to be cleanly isolated. The use of the transmitting beam splitter 112 again limits the spectral range wherein this system may be utilized. The two dispersive gratings may be tipped at a selected angle in a plane perpendicular to the dispersion plane, with appropriate processing as described above, to remove the Fourier transform ambiguity.

Figure 13:
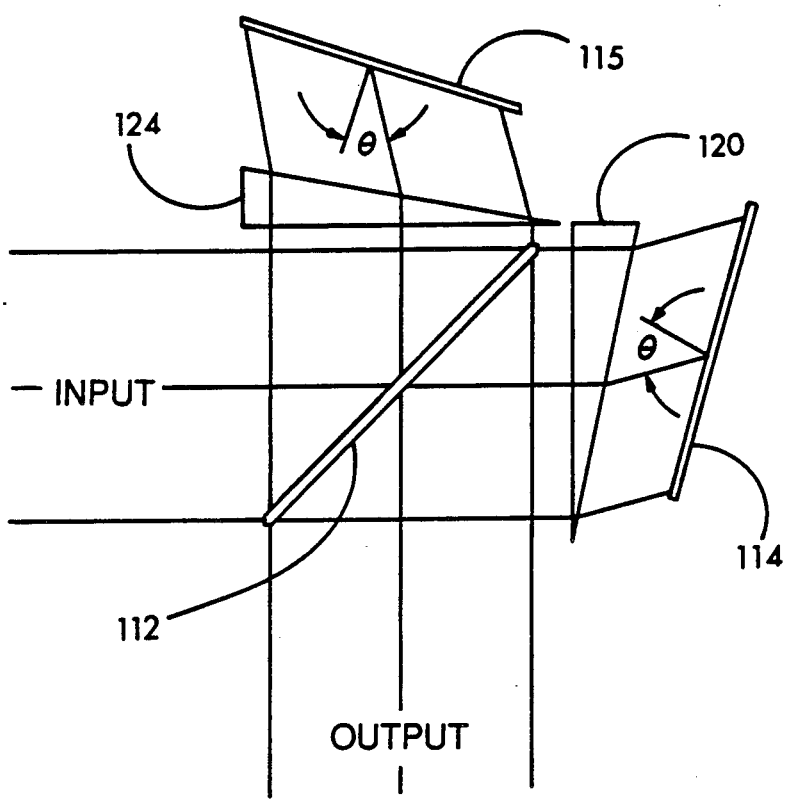
FIG. 13 is a schematic view of an interferometer as in FIG. 12 with prism wedges utilized for field compensation.

A field compensated version of the interferometer of FIG. 12 is shown in FIG. 13. All of the components are the same except that compensating prism wedges 120 and 121 are inserted between the beam splitter 112 and the gratings 114 and 115, respectively. Again, the prisms provide the field compensation advantages described above while limiting the spectral range within which the system may be utilized to applications where suitably transmitting prism material is available.

It is understood that the invention is not confined to the particular embodiments set forth herein as illustrative, but embraces all such modified forms thereof as come within the scope of the following claims.

What is claimed is:

1. A spatial heterodyne spectrometer for analyzing electromagnetic radiation from a source of such radiation, comprising:
   (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts;
   (b) input means for receiving the radiation from the source and producing a collimated beam which is provided as the input beam to the interferometer;
   (c) an imaging detector;
   (d) means for imaging the output beam from the interferometer onto the imaging detector; and
   (e) means for taking the Fourier transform of the intensity of the image across the imaging detector to determine the spatial frequency content in the image,
   wherein the interferometer, the input means and the means for imaging are all formed of reflective elements.

2. A spatial heterodyne spectrometer for analyzing electromagnetic radiation from a source of such radiation, comprising:
   (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes a dispersive grating having a diffraction angle $\theta$, the dispersive grating receiving the incoming collimated beam, further including two beam return mirrors positioned to the sides of the grating to reflect the two beams dispersed from the grating back to the grating where the beams are recombined into a single output beam;
   (b) input means for receiving the radiation from the source and producing a collimated beam which is provided as the input beam to the interferometer;
   (c) an imaging detector;
   (d) means for imaging the output beam from the interferometer onto the imaging detector; and
   (e) means for taking the Fourier transform of the intensity of the image across the imaging detector to determine the spatial frequency content in the image.

3. The spectrometer of claim 2 wherein the input means includes a collimating mirror positioned to receive radiation from the source and direct it in a collimated beam to the grating, and wherein the collimating mirror also receives the recombined output beam from the grating, and further including an imaging mirror which receives the output beam reflected from the collimating mirror and images the beam on the imaging detector.

4. The spectrometer of claim 2 further including a field compensation prism mounted between each of the return mirrors and the dispersive grating to provide field compensation so that the range of input angles can be increased without degrading the resolving power of the spectrometer.

5. The spectrometer of claim 2 wherein the return mirrors are tipped at a selected angle in a plane perpendicular to the dispersion plane, wherein the imaging detector forms a two dimensional image signal corresponding to the two dimensional image on the detector, and wherein the means for taking the Fourier transform performs a two dimensional Fourier transform of the intensity of the image in two dimensions across the imaging detector to determine the two dimensional spatial frequency thereof.

6. A spatial heterodyne spectrometer for analyzing electromagnetic radiation from a source of such radiation, comprising:
 (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes a main dispersive grating having a selected diffraction angle $\theta$ and two return gratings positioned to the sides of the main grating to receive the two beams dispersed from the main grating and oriented to return part of the beam incident thereon back to the main grating where the return beams are recombined into the output beam of the interferometer;
 (b) input means for receiving the radiation from the source and producing a collimated beam which is provided as the input beam to the interferometer;
 (c) an imaging detector;
 (d) means for imaging the output beam from the interferometer onto the imaging detector; and
 (e) means for taking the Fourier transform of the intensity of the image across the imaging detector to determine the spatial frequency content in the image.

7. The spectrometer of claim 6 wherein the main grating has a selected diffraction angle $\theta$ and the two side gratings have identical diffraction angles $\theta'$ which are not equal to $\theta$.

8. The spectrometer of claim 7 further including a field compensation prism mounted in each of the beam paths from the first dispersive grating to the second dispersive grating to provide field compensation such that the range of input angles can be increased without degrading the resolving power of the spectrometer.

9. The spectrometer of claim 7 wherein the side gratings of the interferometer are tipped at a selected angle in a plane perpendicular to the dispersion plane, and wherein the imaging detector forms a two dimensional image signal corresponding to the two dimensional image formed thereon, and wherein the means for taking the Fourier transform performs a two dimensional Fourier transform of the intensity of the image across the imaging detector to determine the two dimensional spatial frequency content of the image.

10. The spectrometer of claim 6 further including a field compensation prism between each of the return gratings and the main grating to provide field compensation so that the range of input angles can be increased without degrading the resolving power of the spectrometer.

11. The spectrometer of claim 6 wherein the return gratings are tipped at a selected angle in a plane perpendicular to the dispersion plane, and wherein the imaging detector forms a two dimensional image signal corresponding to the image on the detector, and wherein the means for taking the Fourier transform performs a two dimensional Fourier transform of the intensity of the image across the imaging detector to determine the two dimensional spatial frequency content of the image.

12. A spatial heterodyne spectrometer for analyzing electromagnetic radiation from a source of such radiation, comprising:
 (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes two dispersive gratings of differing diffraction angles and a pair of mirrors mounted between the gratings to deflect the two beams dispersed from the first of the gratings to the second grating which recombines the beams into the output beam from the interferometer;
 (b) input means for receiving the radiation from the source and producing a collimated beam which is provided as the input beam to the interferometer, and wherein the input means directs the collimated input beam to the first grating;
 (c) an imaging detector;
 (d) means for imaging the output beam from the interferometer onto the imaging detector, wherein the means for imaging receives the combined beam from the second grating and images it on the imaging detector; and
 (e) means for taking the Fourier transform of the intensity of the image across the imaging detector to determine the spatial frequency content in the image.

13. The spectrometer of claim 12 wherein the input means comprises a collimating mirror positioned to receive radiation from the source and direct the collimated beam to the first grating and wherein the imaging means includes a separate imaging mirror positioned to receive the recombined output beam from the second grating.

14. A spatial heterodyne spectrometer for analyzing electromagnetic radiation from a source of such radiation, comprising:
 (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes two dispersive gratings and a partially transmissive beam splitter, the two gratings and the beam splitter arranged so that the incoming collimated beam is partially reflected by the beam splitter to a first of the gratings and partially transmitted through the beam splitter to the second of the gratings, and wherein the return beam from the first grating is partially transmitted through the beam splitter and the return beam from the second grating is partially reflected from the beam splitter to recombine the two beams into the output beam from the interferometer, further including a field compensation prism between each of the gratings and the beam splitter to provide field compensation such that the range of input angles can be increased without degrading the resolving power of the spectrometer;
  (b) input means for receiving the radiation from the source and producing a collimated beam which is provided as the input beam to the interferometer;
  (c) an imaging detector;
  (d) means for imaging the output beam from the interferometer onto the imaging detector; and
  (e) means for taking the Fourier transform of the intensity of the image across the imaging detector to determine the spatial frequency content in the image.

15. A spatial heterodyne spectrometer for analyzing electromagnetic radiation from a source of such radiation, comprising:
  (a) a dispersive two beam interferometer constructed to receive a single input beam and produce an output beam composed of two beams formed from the input bean and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes two dispersive gratings and a partially transmissive beam splitter, the two gratings and the beam splitter arranged so that the incoming collimated beam is partially reflected by the beam splitter to a first of the gratings and partially transmitted through the beam splitter to the second of the gratings, and wherein the return beam from the first grating is partially transmitted through the beam splitter and the return beam from the second grating is partially reflected from the beam splitter to recombine the two beams into the output beam from the interferometer, wherein the two dispersive gratings of the interferometer are tipped at a selected angle in a plane perpendicular to the dispersion plane;
  (b) input means for receiving the radiation from the source and producing a collimated beam which is provided as the input beam to the interferometer;
  (c) an imaging detector, wherein the imaging detector forms a two dimensional image signal corresponding to the two dimensional image formed thereon;
  (d) means for imaging the output beam from the interferometer onto the imaging detector; and
  (e) means for taking the Fourier transform of the intensity of the image across the imaging detector to determine the spatial frequency content in the image, wherein the means for taking the Fourier transform performs a two dimensional Fourier transform of the intensity of the image across the imaging detector to determine the two dimensional spatial frequency content of the image.

16. A method for correcting for spatial non-uniformities in a source of electromagnetic radiation and in a spectrometer system having a dispersive two beam interferometer which receives a single input beam from the source and produces an output beam composed of two beams recombined so that the angle between the wavefronts of the two beams for each wavelength in the beam is directly related to the deviation of the wavelength from a selected null wavelength $\lambda_o$ at which there is zero angle between the recombined wavefronts, comprising the steps of:
  (a) forming a first image of radiation from the source passed through the interferometer with a first total path length through the interferometer to the position at which the image is obtained;
  (b) forming a second image of radiation from the same source passed through the interferometer and imaged at a position having a different total path length through the interferometer to the position at which the second image is obtained such that the total path length difference between the first and second images is $\lambda_o/2$;
  (c) determining a final image comprising the difference of the first and second images divided by the sum of the first and second images.

17. The method of claim 16 further comprising the step of taking the Fourier transforms of the final image to determine the spatial frequency content thereof.

18. A method of obtaining a spectrum of electromagnetic radiation from a source comprising the steps of:
  (a) collimating the radiation from the source into an input beam;
  (b) dispersing the collimated input beam with a diffraction grating into two beams and recombining the beams such that the angle between the wavefronts from each of the two beams at each wavelength in the two beams is related to the deviation of the wavelength from a null wavelength at which the wavefronts from the two beams are parallel;
  (c) forming an image of the recombined beams and determining the spatially varying intensity across the image; and
  (d) taking the Fourier transform of the intensity of the image to determine the spatial frequency content of the image which corresponds to relative wavelength deviations from the null wavelength of the radiation received from the source.

19. A spatial heterodyne spectrometer for analyzing electromagnetic radiation from a source of such radiation, comprising:
  (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts;
  (b) input means for receiving the radiation from the source and producing a collimated beam which is provided as the input beam to the interferometer;
  (c) an imaging detector; and
  (d) means for imaging the output beam from the interferometer onto the imaging detector;
  wherein the interferometer, the input means and the means for imaging are all formed of reflective elements.

20. A spatial heterodyne spectrometer for analyzing electromagnetic radiation from a source of such radiation, comprising:
  (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes a dispersive grating having a diffraction angle $\theta$, the dispersive grating receiving the incoming collimated beam, further including two beam return mirrors positioned to the sides of the grating to reflect the two beams dispersed from the grating back to the grating where the beams are recombined into a single output beam;
  (b) input means for receiving the radiation from the source and producing a collimated beam which is provided as the input beam to the interferometer;
  (c) an imaging detector; and
  (d) means for imaging the output beam from the interferometer onto the imaging detector.

21. The spectrometer of claim 20 wherein the input means includes a collimating mirror positioned to receive radiation from the source and direct it in a collimated beam to the grating, and wherein the collimating mirror also receives the recombined output beam from the grating, and further including an imaging mirror which receives the output beam reflected from the collimating mirror and images the beam on the imaging detector.

22. The spectrometer of claim 20 further including a field compensation prism mounted between each of the return mirrors and the dispersive grating to provide field compensation so that the range of input angles can be increased without degrading the resolving power of the spectrometer.

23. The spectrometer of claim 20 wherein the return mirrors are tipped at a selected angle in a plane perpendicular to the dispersion plane, and wherein the imaging detector forms a two dimensional image signal corresponding to the two dimensional image on the detector.

24. A spatial heterodyne spectrometer for analyzing electromagnetic radiation from a source of such radiation, comprising:
  (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes a main dispersive grating having a selected diffraction angle $\theta$ and two return gratings positioned to the sides of the main grating to receive the two beams dispersed from the main grating and oriented to return part of the beam incident thereon back to the main grating where the return beams are recombined into the output beam of the interferometer;
  (b) input means for receiving the radiation from the source and producing a collimated beam which is provided as the input beam to the interferometer;
  (c) an imaging detector; and
  (d) means for imaging the output beam from the interferometer onto the imaging detector.

25. The spectrometer of claim 24 wherein the main grating has a selected diffraction angle $\theta$ and the two side gratings have identical diffraction angles $\theta'$ which are not equal to $\theta$.

26. The spectrometer of claim 25 further including a field compensation prism mounted in each of the beam paths from the first dispersive grating to the second dispersive grating to provide field compensation such that the range of input angles can be increased without degrading the resolving power of the spectrometer.

27. The spectrometer of claim 25 wherein the side gratings of the interferometer are tipped at a selected angle in a plane perpendicular to the dispersion plane, and wherein the imaging detector forms a two dimensional image signal corresponding to the two dimensional image formed thereon.

28. The spectrometer of claim 24 further including a field compensation prism between each of the return gratings and the main grating to provide field compensation so that the range of input angles can be increased without degrading the resolving power of the spectrometer.

29. The spectrometer of claim 24 wherein the return gratings are tipped at a selected angle in a plane perpendicular to the dispersion plane, and wherein the imaging detector forms a two dimensional image signal corresponding to the image on the detector.

30. A spatial heterodyne spectrometer for analyzing electromagnetic radiation from a source of such radiation, comprising:
  (a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes two dispersive gratings of differing diffraction angles and a pair of mirrors mounted between the gratings to deflect the two beams dispersed from a first of the gratings to the second grating which recombines the beams into the output beam from the interferometer;
  (b) input means for receiving the radiation from the source and producing a collimated beam which is provided as the input beam to the interferometer, wherein the input means directs the collimated input beam to the first grating;
  (c) an imaging detector; and
  (d) means for imaging the output beam from the interferometer onto the imaging detector, wherein the means for imaging receives the combined beam from the second grating and images it on the imaging detector.

31. The spectrometer of claim 30 wherein the input means comprises a collimating mirror positioned to receive radiation from the source and direct the collimated beam to the first grating and wherein the imaging means includes a separate imaging mirror positioned to receive the recombined output beam from the second grating.

32. A spatial heterodyne spectrometer for analyzing electromagnetic radiation from a source of such radiation, comprising:
(a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes two dispersive gratings and a partially transmissive beam splitter, the two gratings and the beamsplitter arranged so that the incoming collimated beam is partially reflected by the beam splitter to a first of the gratings and partially transmitted through the beam splitter to the second of the gratings, and wherein the return beam from the first grating is partially transmitted through the beam splitter and the return beam from the second grating is partially reflected from the beam splitter to recombine the two beams into the output beam from the interferometer, further including a field compensation prism between each of the gratings and the beam splitter to provide field compensation such that the range of input angles can be increased without degrading the resolving power of the spectrometer;
(b) input means for receiving the radiation from the source and producing a collimated beam which is provided as the input beam to the interferometer;
(c) an imaging detector; and
(d) means for imaging the output beam from the interferometer onto the imaging detector.

33. A spatial heterodyne spectrometer for analyzing electromagnetic radiation from a source of such radiation, comprising:
(a) a dispersive two beam interferometer constructed to receive a single input beam and produce an output beam composed of two beams formed from the input beam and recombined such that the angle between the wavefronts of the two beams for each wavelength in the beams is directly related to the deviation of the wavelength from a selected null wavelength $\lambda_o$ at which there is zero angle between the recombined wavefronts, wherein the interferometer includes two dispersive gratings and a partially transmissive beam splitter, the two gratings and the beam splitter arranged so that the incoming collimated beam is partially reflected by the beam splitter to a first of the gratings and partially transmitted through the beam splitter to the second of the gratings, and wherein the return beam from the first grating is partially transmitted through the beam splitter and the return beam from the second grating is partially reflected from the beam splitter to recombine the two beams into the output beam from the interferometer, and wherein the two dispersive gratings of the interferometer are tipped at a selected angle in a plane perpendicular to the dispersion plane, and wherein the imaging detector forms a two dimensional image signal corresponding to the two dimensional image formed thereon;
(b) input means for receiving the radiation from the source and producing a collimated beam which is provided as the input beam to the interferometer;
(c) an imaging detector; and
(d) means for imaging the output beam from the interferometer onto the imaging detector.

* * * * *